(12) United States Patent
Gray et al.

(10) Patent No.: US 9,426,128 B2
(45) Date of Patent: Aug. 23, 2016

(54) SYSTEM FOR GENERATING A SECURITY DOCUMENT

(71) Applicant: Recipero Ltd, Gloucestershire (GB)

(72) Inventors: Les Gray, Gloucestershire (GB); Steven Andrew Shepherd, Gloucestershire (GB); Michael Arthur David Hancock, Surrey (GB)

(73) Assignee: Recipero Ltd (GB)

( * ) Notice: Subject to any disclaimer, the term of this patent is extended or adjusted under 35 U.S.C. 154(b) by 65 days.

(21) Appl. No.: 14/322,598

(22) Filed: Jul. 2, 2014

(65) Prior Publication Data

US 2015/0012754 A1  Jan. 8, 2015

(30) Foreign Application Priority Data

Jul. 5, 2013 (GB) .................................. 1312146.2

(51) Int. Cl.
*H04L 9/32* (2006.01)
*H04L 29/06* (2006.01)

(52) U.S. Cl.
CPC .......... *H04L 63/0428* (2013.01); *H04L 63/123* (2013.01)

(58) Field of Classification Search
CPC   H04L 63/0428; H04L 63/123; G06Q 30/018; G07D 7/0006
USPC .......................................... 713/165, 167, 181
See application file for complete search history.

(56) References Cited

U.S. PATENT DOCUMENTS 3,890,599 A   6/1975  Simjian 8,429,174 B2 *  4/2013  Ramani ............. G06F 17/30259
345/419

(Continued)

FOREIGN PATENT DOCUMENTS

CA           2349493        12/2001

*Primary Examiner* — Samson Lemma
(74) *Attorney, Agent, or Firm* — Schwegman, Lundberg & Woessner, P.A.

(57) ABSTRACT

A system for generating a security document includes a plurality of computing nodes forming a computing cluster, each computing node having a node identifier for uniquely identifying the node within the cluster, each node being capable of running multiple concurrent processes, and each process having a process identifier for uniquely identifying the process within the node,
at least some of the processes on at least some of the nodes being adapted to perform the steps of:
 a. collecting information for inclusion in the document, the information including at least a subject identifier for uniquely identifying a subject of the document;
 b. generating a first random value and a second random value;
 c. concatenating the subject identifier and the second random value;
 d. applying a cryptographic hash function to the concatenation of the subject identifier and the second random value, resulting in a message digest value;
 e. truncating the message digest value;
 f. generating a document identifier comprising a concatenation of the node identifier, a first delimiter, the process identifier, the first delimiter, the first random value, a second delimiter, and the truncated message digest value;
 g. generating the security document, and applying the document identifier visibly to the document; and
 h. storing the document and the document identifier in a database, the document being retrievable from the database by means of the document identifier.

11 Claims, 2 Drawing Sheets

| Variable name | Description | Example value |
|---|---|---|
| SERIAL | Subject identifier (e.g. IMEI of mobile phone) | 0123456789 |
| R1 | Random value 1 | 0fe2 |
| R2 | Random value 2 | 48436 |
| NODE | Node identifier | 10 |
| APP | Process identifier | 5 |
| SALT | MD5 (SERIAL ++ R2) | 93c79fe4f10df052bc11f15fc96da4e8 |
| HASH | SUBSTRING(SALT,1,8) | 93c79fe4 |
| D1 | Character constant | - |
| D2 | Character constant | : |
| DOCID | Document identifier (applied to document) | 10-5-0fe2:93c79fe4 |

(56) References Cited

U.S. PATENT DOCUMENTS

| | | | |
|---|---|---|---|
| 8,689,011 B2* | 4/2014 | Bauchot | G06F 21/10 713/193 |
| 8,903,788 B2* | 12/2014 | Wolff | G06F 17/30165 707/698 |
| 2006/0059204 A1* | 3/2006 | Borthakur | G06F 17/30864 |
| 2011/0055585 A1* | 3/2011 | Lee | H04L 9/0844 713/183 |
| 2014/0164352 A1* | 6/2014 | Denninghoff | H03H 9/02622 707/711 |
| 2014/0331062 A1* | 11/2014 | Tewari | G06F 21/6227 713/189 |

* cited by examiner

| Variable name | Description | Example value |
|---|---|---|
| SERIAL | Subject identifier (e.g. IMEI of mobile phone) | 0123456789 |
| R1 | Random value 1 | 0fe2 |
| R2 | Random value 2 | 48436 |
| NODE | Node identifier | 10 |
| APP | Process identifier | 5 |
| SALT | MD5 (SERIAL ++ R2) | 93c79fe4f10df052bc11f15fc96da4e8 |
| HASH | SUBSTRING(SALT,1,8) | 93c79fe4 |
| D1 | Character constant | - |
| D2 | Character constant | : |
| DOCID | Document identifier (applied to document) | 10-5-0fe2:93c79fe4 |

Figure 2

SYSTEM FOR GENERATING A SECURITY DOCUMENT

PRIORITY APPLICATION

This application claims the benefit under 35 U.S.C. §119 to United Kingdom Application No. GB1312146.2, filed on 5 Jul. 2013; which application is incorporated herein by reference in its entirety.

TECHNICAL FIELD

The present invention relates to a system for generating a security document, and to a method of generating a non-reversible unique identifier suitable for retrieval and verification of documents stored across a plurality of storage locations.

BACKGROUND TO THE INVENTION

Various documents are used to provide evidence of certain properties of specified items. For example, an MOT certificate provides evidence of the roadworthiness of a specified vehicle, and a valuation report provides evidence of the value of a specified article. Certificates are also available showing that particular articles (typically mobile telephones and other consumer electronics) have or have not been the subject of insurance claims, reported stolen, blocked by mobile phone networks, and so on.

Such documents are used by sellers to provide buyers with confidence in the items they are purchasing. A buyer of a second hand mobile telephone in particular will seek certainty that the handset has not been blocked by networks, has not been stolen, and that no third parties have potential claims to the item. As such, a certificate issued by a trusted authority which confirms these facts will increase the value of the item in the marketplace. These certificates are typically tied to a particular device by means of the serial number of the device.

Unfortunately, all documents are susceptible to forgery. In particular, an unscrupulous seller may obtain a genuine document showing a 'clean' history, and alter it to show a different device serial number. A buyer may thus be unwittingly tricked into buying a stolen device.

It is known to provide on-line databases for verifying the authenticity of documents. In such systems, copies of genuine documents are stored in a database, and are retrievable by means of a document identification number. Since the user requesting retrieval of a document knows that he is directly accessing the database belonging to the trusted authority which generated the document, he can be confident that the document thus retrieved will not have been tampered with by a third party.

A purported genuine document can therefore be verified by using the document identification number printed on the document to retrieve a copy of the document from the database. The retrieved copy can then be compared with the purported genuine document to ensure that no alterations have been made. However, such systems are not without their problems. Often the document identifier is the same as, or derivable from, the serial number of the article in question. An unscrupulous trader could therefore obtain documents relating to devices in which he has no legitimate interest. Those documents could be used to defraud consumers, for example by changing the serial number of a device to match that shown in the (genuine and verifiable) document. An even simpler fraud could involve obtaining documents relating to devices with serial numbers differing by one digit from stolen devices which the trader is attempting to sell. A consumer could readily be misled by such documents, since a difference of one digit in, say, a sixteen digit serial number could easily go unnoticed.

A large-scale system for generating documents will likely comprise a plurality of computer systems working in parallel to generate and store documents. This is necessary to deal with large volumes of requests, but creates a problem in terms of document retrieval. It is possible to generate a central index of document identifiers which can be queried, and which points to the storage location of a particular individual document. However, such an arrangement creates an extra layer of complexity, and makes the overall system more vulnerable to failure.

In a system where multiple computers work in parallel, for some document identifier generation schemes there is a risk that different computers in the same cluster will generate document identifiers which are the same. In other words, there is a collision. This can be avoided by checking between clusters for existing documents. However, this creates additional network and database load, impacting performance. It also imposes a practical limit on the size of the cluster.

It is an object of the present invention to reduce or substantially obviate the above mentioned problems.

BRIEF SUMMARY OF THE INVENTION

According to the present invention, there is provided a system for generating a security document,
  the system including a plurality of computing nodes forming a computing cluster, each computing node having a node identifier for uniquely identifying the node within the cluster, each node being capable of running multiple concurrent processes, and each process having a process identifier for uniquely identifying the process within the node,
at least some of the processes on at least some of the nodes being adapted to perform the steps of:
  a. collecting information for inclusion in the document, the information including at least a subject identifier for uniquely identifying a subject of the document;
  b. generating a first random value and a second random value;
  c. concatenating the subject identifier and the second random value;
  d. applying a cryptographic hash function to the concatenation of the subject identifier and the second random value, resulting in a message digest value;
  e. truncating the message digest value;
  f. generating a document identifier comprising a concatenation of the node identifier, a first delimiter, the process identifier, the first delimiter, the first random value, a second delimiter, and the truncated message digest value;
  g. generating the security document, and applying the document identifier visibly to the document; and
  h. storing the document and the document identifier in a database, the document being retrievable from the database by means of the document identifier.

The computing nodes running multiple concurrent processes may do so with a single processor core and a conventional multitasking operating system. Actual parallel processing within the node is not required, though it may be utilised. The processes are concurrent in the sense that they run independently, and one process does not need to rely on another process finishing or being in a particular state.

The database may be any storage system which is capable of storing a document for retrieval by the document identifier. The database may be external to the node which generates the document, although in a preferred embodiment the document is initially stored on the same computing node which generated the document and is then replicated asynchronously to multiple database nodes for redundant storage.

The information collected may be, for example, the results of searches of stolen property, insurance claim, and blocked device registers. The subject identifier will typically be a serial number for a device, which uniquely identifies the device at least within a family of devices of the same type or model. For some devices, the serial number may need to be augmented to uniquely identify the device within a reasonably wide product family. For example, a mobile telephone IMEI should identify a mobile handset uniquely. A serial number for a DVD player on the other hand may need to be concatenated with a make and/or model to form a unique subject identifier to identify the device uniquely amongst all DVD players.

The first and second random values may be generated by a pseudo-random number generating function, as is typically available in most computing environments.

The document identifier generated and applied to the document by the method is reasonably short and easy to manually enter into a retrieval system. At the same time, the probability of two different valid documents being generated with the same document identifier is extremely low. The combination of a truncated message digest, and the presence of the first random value and the node and process identifiers in the document identifier, leads to this dual advantage.

Furthermore, if a document were to be generated having a document identifier the same as an already existing identifier, in other words, if there is a collision, then this condition can easily been detected and the attempt to generate the document identifier may simply be repeated. On the second attempt, the random values will be different, and a collision will likely be avoided. Collisions only need to be detected within the same process on the same computing node, since unique identifiers for process and node are included in the document identifier. Therefore, an identifier which is unique within one process can be guaranteed to be unique across the entire cluster, without the need to interrogate databases on other nodes. The system therefore reduces database and network load which would otherwise be caused by inter-node queries, and also allows nodes to generate and store documents completely concurrently, without the risk of a race condition in which a two nodes check for collisions at the same time, determine that there is no collision, and then both store documents with identical identifiers.

Due to the cryptographic hash function and the random values, it is difficult to guess valid document identifiers. It is also difficult for an outside entity to derive a valid document identifier from a device serial number. Opportunities for fraud are thus reduced, since unscrupulous traders will not be able to obtain arbitrary documents for legitimate devices, the serial numbers of which could then be cloned onto stolen devices. It will also not be possible to obtain documents for given serial numbers, for example, a serial number which differs by only one digit from that of a stolen device.

According to a second aspect of the present invention, there is provided a method of generating a security document on a computing process, the process running on a computing node and the computing node forming part of a computing cluster, each computing cluster including multiple computing nodes and each node having a node identifier for uniquely identifying the node within the cluster, each node being capable of running multiple concurrent processes, and each process having a process identifier for uniquely identifying the process within the node, and the method comprising the steps of:
a. collecting information for inclusion in the document, the information including at least a subject identifier for uniquely identifying a subject of the document;
b. generating a first random value and a second random value;
c. concatenating the subject identifier and the second random value;
d. applying a cryptographic hash function to the concatenation of the subject identifier and the second random value, resulting in a message digest value;
e. truncating the message digest value;
f. generating a document identifier comprising a concatenation of the node identifier, a first delimiter, the process identifier, the first delimiter, the first random value, a second delimiter, and the truncated message digest value;
g. generating the security document, and applying the document identifier visibly to the document; and
h. storing the document and the document identifier in a database, the document being retrievable from the database by means of the document identifier.

BRIEF DESCRIPTION OF THE DRAWINGS

FIG. 2 illustrates a table of variables and example values.

DETAILED DESCRIPTION OF THE INVENTION

Figure 1:
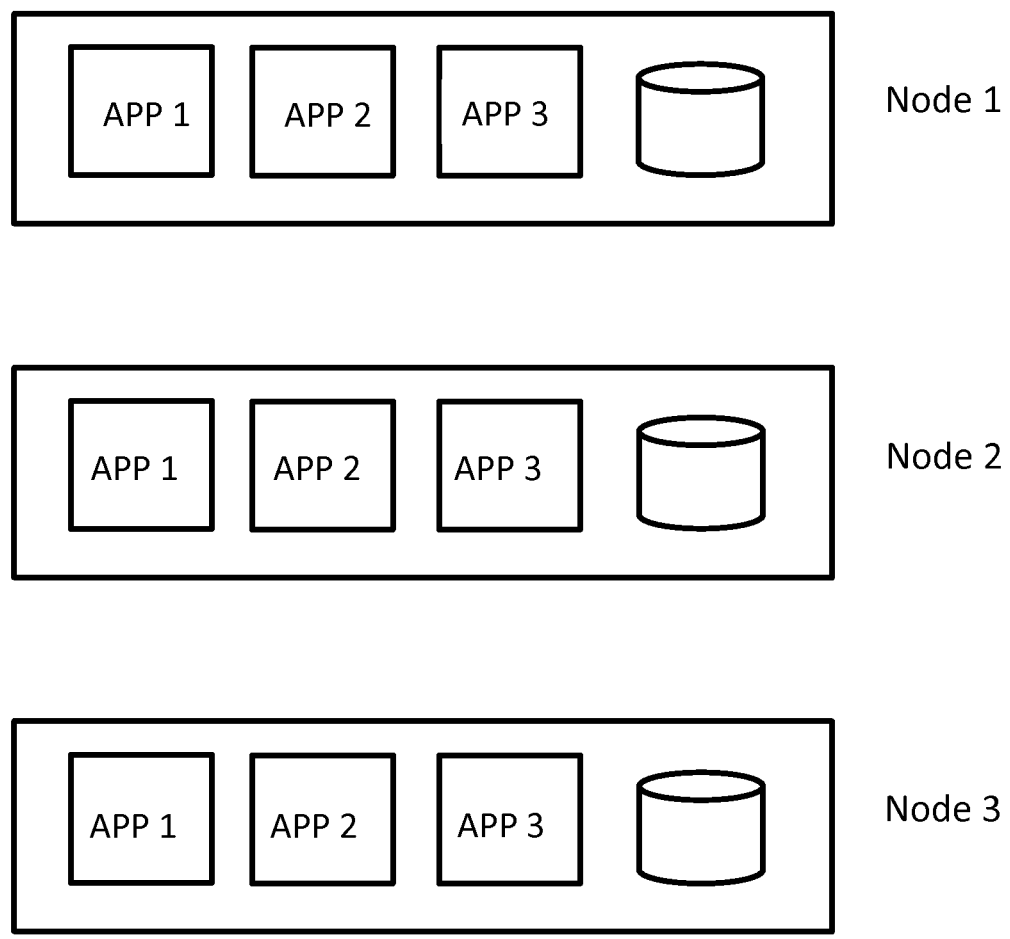
FIG. 1 illustrates an embodiment of an arrangement of nodes forming a cluster.

For a better understanding of the present invention, and to show how it may be carried into effect, a preferred embodiment will now be described, by way of example only.

An embodiment of a document generation system includes a plurality of computing nodes. The computing nodes are general purpose computers. Each computing node is capable of running multiple concurrent processes. When a document needs to be generated, the request will be passed to a node with available processing resources. FIG. 1 illustrates the arrangement of nodes forming the cluster. Each node is shown with three running document generation processes (APP1, APP2 and APP3) and a database.

The document which is to be generated may be a human-readable or machine-readable document. It may include various information relating, for example, to the provenance of an electronic device. The source of such information is outside the scope of the present invention, and the skilled person will appreciate that there are numerous known methods of formatting such information and presenting it in a human or machine readable document. In a typical embodiment, a PDF document may be produced.

The computing nodes form a cluster, but it is an advantage of the invention that each process on each node operates independently, with minimal or no communication between nodes. The method of generating a document identifier, as it applies to an individual process on an individual node will therefore now be described, with reference to FIG. 2 which is a table of variables and example values.

The input to the process is a serial number (SERIAL) of a device that is the subject of the document. Two random values (R1, R2) are generated. R1 is generated as a hexadecimal representation of the current value of a microsecond timer of the current computing node. The value of R1 is therefore materially random for this application. R2 is generated as a decimal representation of an integer from a pseudo-random number generator.

NODE and APP are decimal integers, which within the process have a constant value. NODE is a unique identifier for the computing node within the cluster, and APP is a unique identifier for the process running within that computing node.

SERIAL and R2 are concatenated, and the MD5 message digest function is applied to the concatenation of those values. A hexadecimal representation of the resulting digest is stored in a variable named SALT.

SALT is truncated by removing all characters after the first eight. The resulting truncated digest is stored in a variable named HASH.

D1 and D2 are character constants, in this embodiment respectively having values '-' (hyphen) and ':' (colon).

DOCID is the output document identifier, and is a concatenation of various values as follows:

NODE, D1, APP, D1, R1, D2, HASH.

An example calculation of a document identifier will now be shown.

In this example, SERIAL is 0123456789. NODE is 10, and APP is 5. In other words, the process is running on the node with node identifier 10 and the process with process identifier 5. The document to which the document identifier will be applied concerns a device with serial number 0123456789.

R1 and R2 are generated by the process. An example value of R1 is 0fe2 and an example value of R2 is 48436.

SERIAL and R2 are concatenated. The result in this case is 012345678948436.

The MD5 message digest function is applied to the concatenated SERIAL and R2. In this case the resulting digest (of 012345678948436) is 93c79fe4f10df052bc11f15fc96da4e8.

The digest is truncated, leaving only the first eight characters. In this case, the truncated digest is 93c79fe4.

D1 and D2 in this example are respectively '-' and ':'.

DOCID, the document identifier, in this example is 10-5-0fe2:93c79fe4

The document identifier is then applied visibly to the generated document. A copy of the document may then be stored alongside the document identifier, possibly on the computing node which generated the document. When the document is to be retrieved, the document identifier allows the request to be sent directly to the node where the document is stored, without any need for lookup in an index, or for querying multiple nodes.

The method is advantageous because it allows a cluster of unbounded size to produce documents. The scale of the system can therefore be increased easily, without technical changes needing to be made. The document identifier is designed to easily facilitate manual entry, whilst being resistant to collisions and secure in that it cannot be easily guessed.

The embodiment described above is provided by way of example only, and various changes and modifications will be apparent to persons skilled in the art without departing from the scope of the present invention as defined by the appended claims.

What is claimed is:

1. A system for generating a security document, comprising:
    a plurality of computing nodes forming a computing cluster, each computing node comprising one or more hardware processors, each computing node having a node identifier for uniquely identifying the node within the cluster, each node being capable of running multiple concurrent processes, each process being executed by at least one of the one or more hardware processors, and each process having a process identifier for uniquely identifying the process within the node, at least some of the processes on at least some of the nodes being adapted to perform the steps of:
    a. collecting information for inclusion in the document, the information including at least a subject identifier for uniquely identifying a subject of the document;
    b. generating a first random value and a second random value;
    c. concatenating the subject identifier and the second random value;
    d. applying a cryptographic hash function to the concatenation of the subject identifier and the second random value, resulting in a message digest value;
    e. truncating the message digest value;
    f. generating a document identifier, by at least one of the one or more hardware processors, comprising a concatenation of the node identifier, a first delimiter, the process identifier, the first random value, a second delimiter, and the truncated message digest value
    g. generating the security document by formatting the information into a human-readable document in the form of a digital file, and applying the document identifier visibly to the document; and
    h. storing the document and the document identifier in a database, the document being retrievable from the database by means of the document identifier.

2. The system for generating a security document as claimed in claim 1, in which the document and document identifier are stored in a database on the same computing node which generated the document.

3. The system for generating a security document as claimed in claim 1, in which the first random value is derived from a microsecond timer on the computing node.

4. The system for generating a security document as claimed in claim 1, in which the cryptographic hash function is the MD5 message digest function.

5. The system for generating a security document as claimed in claim 4, in which the truncated message digest value in step (e) is the first eight characters of the hexadecimal output of the MD5 function.

6. The system for generating a security document as claimed in claim 1, in which the first delimiter is different from the second delimiter.

7. A method of generating a security document on a computing process, the process running on a computing node comprising one or more hardware processors, the computing node forming part of a computing cluster, each computing cluster including multiple computing nodes and each node having a node identifier for uniquely identifying the node within the cluster, each node being capable of running multiple concurrent processes, each process being executed by least one of the one or more hardware processors and each process having a process identifier for uniquely identifying the process within the node, and the method comprising:
    a. collecting information for inclusion in the document, the information including at least a subject identifier for uniquely identifying a subject of the document;
    b. generating a first random value and a second random value;
    c. concatenating the subject identifier and the second random value;
    d. applying a cryptographic hash function to the concatenation of the subject identifier and the second random value; resulting in a message digest value;
    e. truncating the message digest value;
    f. generating a document identifier, by at least one of the one or more hardware processors, comprising a concatenation of the node identifier, a first delimiter, the process identifier, the first random value, a second delimiter, and the truncated message digest value;

g. generating the security document by formatting the information into a human-readable document in the form of a digital file, and applying the document identifier visibly to the document; and h. storing the document and the document identifier in a database, the document being retrievable from the database by means of the document identifier.

8. A system for generating a security document as claimed in claim 1, in which the generated document identifier is checked for identity against document identifiers previously generated by the same process on the same node, the process returning to step (b) if identity is detected, and continuing to step (g) if identity is not detected.

9. A system for generating a security document as claimed in claim 8, in which the generated document identifier is checked for identity only against document identifiers previously generated by the same process on the same node.

10. A system for generating a security document as claimed in claim 2, in which the generated document identifier is checked for identity against document identifiers previously generated by the same process on the same node, the process returning to step (b) if identity is detected, and continuing to step (g) if identity is not detected.

11. A system for generating a security document as claimed in claim 10, in which the generated document identifier is checked for identity only against document identifiers previously generated by the same process on the same node.

\* \* \* \* \*